March 17, 1964    R. H. EISENGREIN    3,125,714
SPEED CONTROL SYSTEM FOR ELECTRICALLY POWERED MECHANISM
Filed June 19, 1959    3 Sheets-Sheet 1
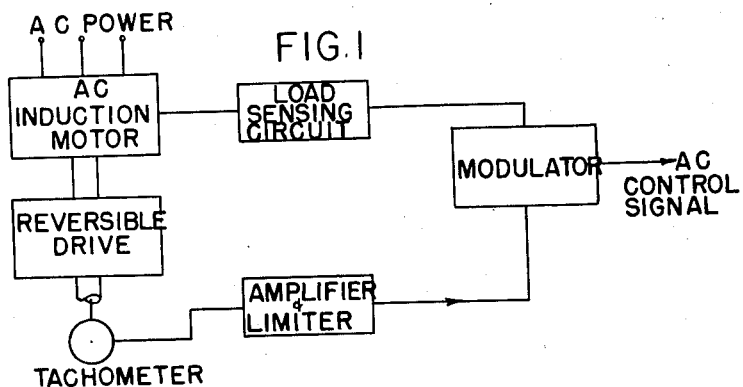
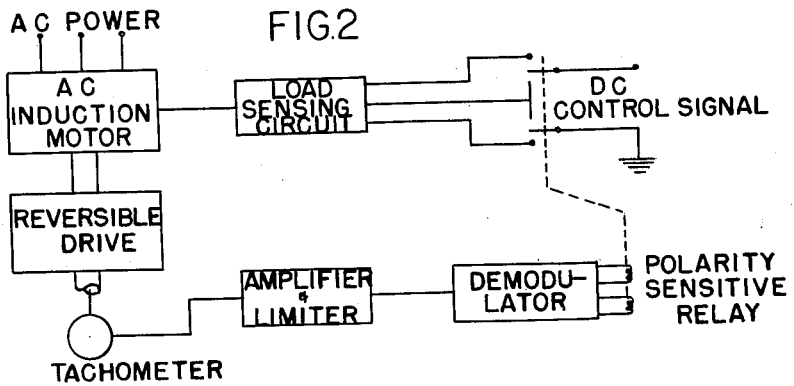
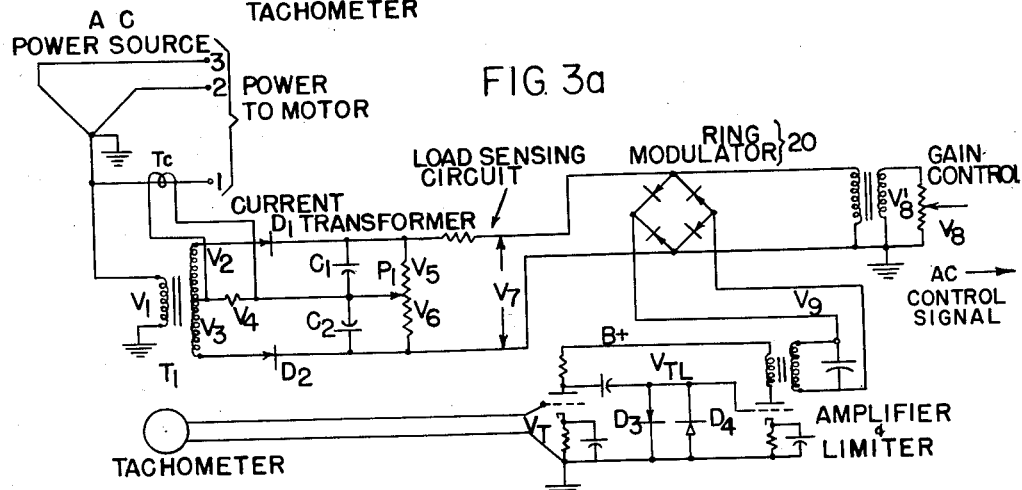
INVENTOR
ROBERT H. EISENGREIN
Charles T. Hawley
ATTORNEY March 17, 1964     R. H. EISENGREIN     3,125,714
SPEED CONTROL SYSTEM FOR ELECTRICALLY POWERED MECHANISM
Filed June 19, 1959

INVENTOR
ROBERT H. EISENGREIN

Charles T. Hawley
ATTORNEY

March 17, 1964     R. H. EISENGREIN     3,125,714
SPEED CONTROL SYSTEM FOR ELECTRICALLY POWERED MECHANISM
Filed June 19, 1959     3 Sheets-Sheet 3
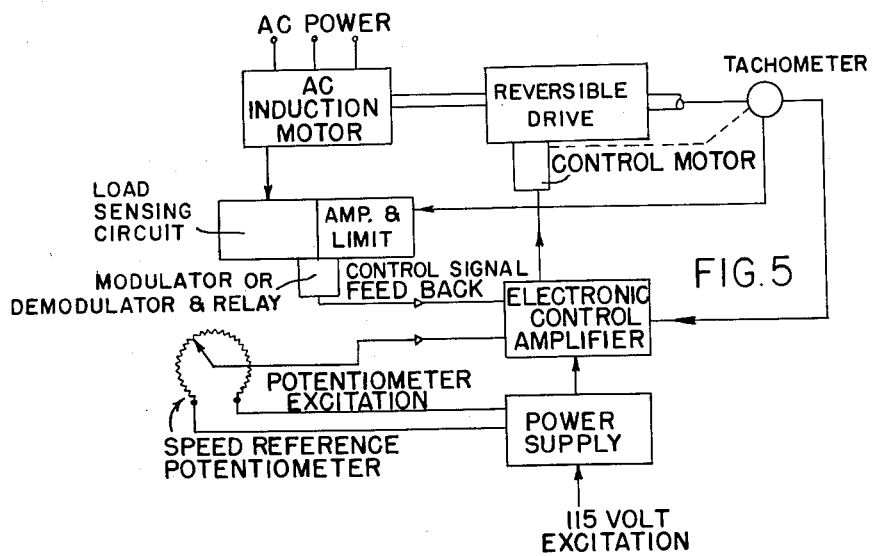
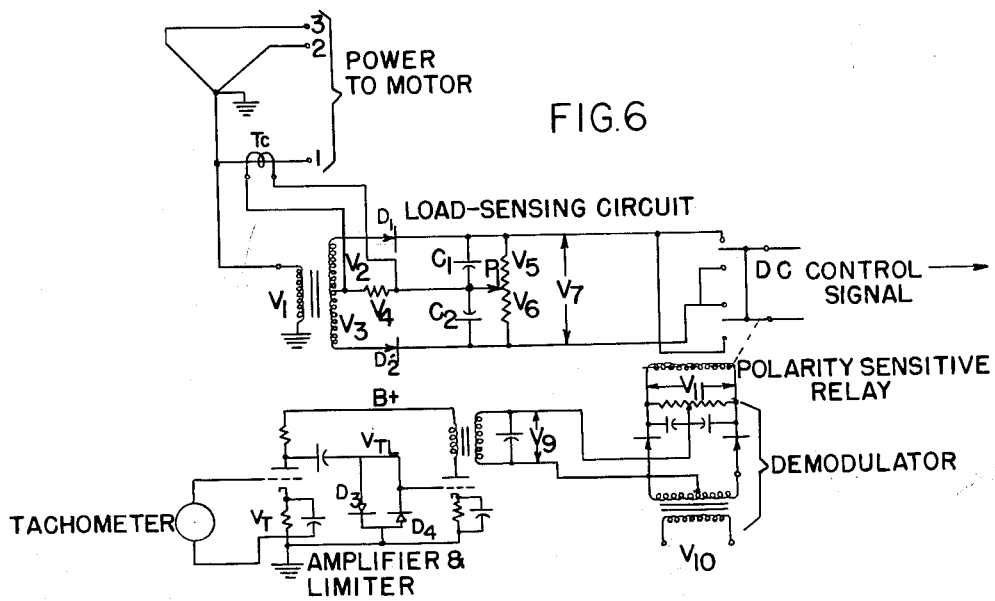
INVENTOR
ROBERT H. EISENGREIN
*Charles T. Hawley*
ATTORNEY

United States Patent Office 3,125,714
Patented Mar. 17, 1964

3,125,714
SPEED CONTROL SYSTEM FOR ELECTRICALLY POWERED MECHANISM
Robert H. Eisengrein, Skaneateles, N.Y., assignor to Seneca Falls Machine Company, Seneca Falls, N.Y., a corporation of Massachusetts
Filed June 19, 1959, Ser. No. 821,417
6 Claims. (Cl. 318—454)

This invention relates to electrically powered mechanism and more particularly to the regulation of speed in such mechanism under changing conditions of load.

In many speed control systems, it is necessary to have extremely close regulation of speed, irrespective of load changes. To achieve such regulation, certain systems sense the load and then feed-back a load-signal to adjust the speed.

For systems using an A.-C. induction motor to drive a power mechanism which provides a reversible power output, the problem of simultaneously measuring both the load and the direction of output speed for the purpose of providing a speed boost or other signal becomes complicated. The instant invention is directed to this problem.

The circuits hereinafter described provide a novel and practical solution to this problem. The circuits as shown are applicable to variable speed drives which utilize an A.-C. motor as the prime source of power.

Preferred forms of the invention are shown in the drawings, in which:

FIG. 1 is a block diagram of an A.-C. control signal circuit of the invention;

FIG. 2 is similar to FIG. 1 but provides a D.-C. control signal;

FIG. 3a is a detailed diagram of the A.-C. control signal circuit shown in FIG. 1;

FIG. 3b shows details of a modification of the circuit shown in FIG. 3a;

FIG. 5 is a block diagram of a complete control system incorporating the control circuit of the invention; and FIG. 6 is a detailed diagram of the D.-C. control signal circuit shown in FIG. 2.

Figure 3B:
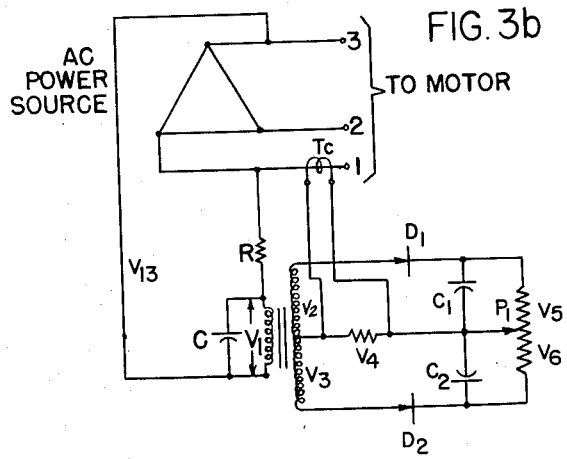

FIG. 5 shows a reversible drive, which can be a mechanical power amplifier of the type described in Small Patent No. 2,569,585, issued October 2, 1951, together with control components, some of which are standard, for accurately controlling the output speed of the reversible drive. An A.-C. induction motor provides the prime power for the mechanical amplifier and a servo motor can be used as the control motor therefor. A tachometer is driven by the mechanical amplifier output, although it could instead be integrally coupled with the servo control motor as indicated in broken lines in FIG. 5.

A speed reference potentiometer provides an A.-C. signal to te electronic control amplifier. The tachometer also provides a signal to the electronic amplifier, and the system connections are such that the tachometer output is compared with the potentiometer output and the resulting electronic amplifier output forces the control motor and tachometer to reach a no-load speed equal to the reference potentiometer setting. This signal combination is conventional. However, as load is applied to the mechanical amplifier output shaft, the speed will drop slightly, since the tachometer feed-back gain is limited to a finite value by practical considerations.

By adding the load-sensing circuit of this invention, described hereafter, a control signal proportional to A.-C. motor load also is supplied to the electronic amplifier. The tachometer amplifier and limiter circuit of this invention ensures that it is supplied in a manner to boost the speed enough to counteract the speed-drop normally existing. By adjusting the gain control to vary the amount of A.-C. signal fed to the electronic amplifier, the system can be made to provide constant speed with load, increasing speed with load, or decreasing speed with load.

By electrical discrimination, the load-sensing circuit of this invention senses only real load presented to the A.-C. induction motor, and provides a D.-C. signal which can be converted to an A.-C. control signal. The magnitude of the control signal is directly proportioned to the load sensed by the load-sensing circuit, and the phase or polarity of this control signal is controlled by the direction of rotation of the output shaft through the tachometer amplifier and limiter circuit of this invention.

For systems which require an A.-C. control signal for feedback to boost the output speed as load increases, the block diagram of FIG. 1 is applicable. The load-sensing circuit, coupled to the induction motor, provides a D.-C. signal directly proportional to the real load or watts on the motor.

A tachometer (or other suitable speed-sensing mechanism) is coupled to the output shaft of the reversible drive and provides an A.-C. signal which has a phase determined by the direction of rotation of the shaft, and a magnitude proportional to its speed. However, the magnitude of such a tachometer signal is limited, so that, above a predetermined speed, its output is constant.

This constant output represents the carrier signal to a modulator circuit. The D.-C. signal from the load sensing circuit is the second input to the modulator circuit. The output signal from the modulator is an A.-C. signal which is in phase with the tachometer signal and has a magnitude proportional to the D.-C. load signal. This control signal thus reflects the characteristics originally required and is fed back to the electronic control amplifier shown in FIG. 5.

For systems requiring a D.-C. load signal to cause the speed-correcting action, the block diagram of FIG. 2 is applicable. The same load sensing circuit is again coupled to the induction motor. An A.-C. tachometer, coupled to the variable speed reversible drive output, has its signal amplified and limited as before. This tachometer signal is supplied to a demodulator which provides a D.-C. voltage which is plus or minus, according to the direction of tachometer rotation.

This demodulator signal is then fed to a polarity-sensitive relay which connects either the direct D.-C. load signal or a reversed D.-C. load signal as a control signal to the speed-adjusting circuit of the electronic control amplifier (FIG. 5), whenever the tachometer signal reaches its limited magnitude. The direction of this feed-back signal depends on the direction of tachometer rotation and its magnitude is directly proportioned to the load.

*Load-Sensing Circuit Details*

The load-sensing circuit of FIG. 1 is shown in more detail in FIG. 3a. The load-sensing circuit has two inputs. The first input signal is the phase-to-ground voltage $V_1$, applied to an A.-C. induction motor. The second input signal (voltage $V_4$) is obtained from a current transformer $T_c$ inserted in the line from which voltage $V_1$ is obtained. Thus, signals $V_1$ and $V_4$ are in phase for unity power factor loads. By combining the signals as shown, the load-sensing circuit will automatically discriminate against reactive current and will always provide a D.-C. voltage ($V_7$) proportioned to the real load (in kilowatts) on the motor.

For three-phase systems without the grounded common shown in FIG. 3a, the correct phase relation between the voltages $V_1$ and $V_4$ can still be obtained, by using the input circuit shown in FIG. 3b. Voltage $V_4$ is then obtained from a current transformer $T_c$ in phase 1, as previously shown. The voltage from phase 1 to phase 3 ($V_{13}$) is phase-shifted via a resistance-capacitance network RC. The resulting voltage ($V_1$) has the same phase characteristics as at $V_1$ in FIG. 3a.

Operation

Figure 4:
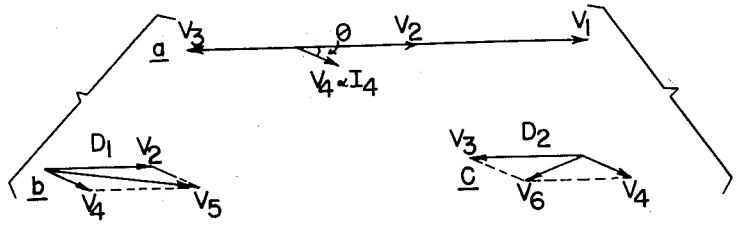
FIG. 4 is a vector diagram showing various phase relationships.

The operation of this feed-back load-sensing circuit is best described by reference to FIG. 3a. The phase relation between voltages $V_1$, $V_2$, $V_3$ and $V_4$ is shown in the diagram of FIG. 4, for the general case where the current in phase 1 is out of phase with the voltage $V_1$.

The voltages $V_2$ and $V_3$ represent the transformed values of $V_1$, with polarities as shown. The rectifier $D_1$ accepts the algebraic sum of signals $V_2$ and $V_4$ and produces the D.-C. voltage $V_5$. The rectifier $D_2$ accepts the algebraic sum of $V_3$ and $V_4$ to produce the D.-C. voltage $V_6$. Voltage $V_7$ is then the algebraic sum of $V_5$ and $V_6$. When the phase 1 current is zero, $V_5=V_6$, and $V_7$ is zero. For any other value of current, $V_7$ has a magnitude directly proportional to the magnitude of current in phase with voltage $V_1$.

The combined action of potentiometer $P_1$ and the two capacitors $C_1$ and $C_2$ filter the voltages $V_5$ and $V_6$ and provide a smooth D.-C. voltage $V_7$. In addition, the potentiometer $P_1$ provides means for balancing $V_7$ to zero for any particular load.

Thus, if a motor drives a variable speed system which has considerable internal losses, this load-sensing circuit can provide a D.-C. signal proportional only to the load above these losses. The combination of potentiometer and capacitor values can also be varied to slow down the operation of the load circuit, so that it is only responsive to slowly changing loads but will not respond to rapid or transient load changes.

Demonstration

To prove the relationships outlined above, it is easier to express the voltages mathematically and to solve for $V_7$. The equations for voltages $V_5$ and $V_6$ (assuming $V_2=V_3$) are:

$$V_5 = \sqrt{(V_2 + V_4 \cos\theta)^2 + (V_4 \sin\theta)^2}$$
$$= \sqrt{V_2^2 + 2V_2V_4\cos\theta + V_4^2}$$

$$V_6 = \sqrt{(V_2 - V_4 \cos\theta)^2 + (V_4 \sin\theta)^2}$$
$$= \sqrt{V_2^2 + 2V_2V_4\cos\theta + V_4^2}$$

Expanding these equations and subtracting $V_6^2$ from $V_5^2$ $$V_5^2 - V_6^2 = 4V_2V_4\cos\theta$$

By rewriting the left-hand side of the equation, you can solve for $V_7$ as shown—

$$V_5^2 - V_6^2 = (V_5+V_6)(V_5-V_6) = 4V_2V_4\cos\theta$$

$$V_7 = V_5 - V_6 = \frac{4V_2V_4\cos\theta}{V_5+V_6}$$

Now substitute the original equations for $V_5$ and $V_6$ $$V_5 - V_6 = \frac{4V_2V_4\cos\theta}{\sqrt{V_2^2+2V_2V_4\cos\theta+V_4^2} + \sqrt{V_2^2-2V_2V_4\cos\theta+V_4^2}}$$

The actual equation for the true motor load is expressed below:

$$\text{True load (kw.)} = [K\,V_2V_4\cos\theta]$$

where $\theta$=power factor angle.

This equation has the same numerator as the equation for $V_7$. If the denominator of the equation for $V_7$ can be kept constant, $V_7$ will truly represent a voltage proportional to real load.

It is apparent that the denominator of the $V_7$ equation will vary with the magnitude of the current, that is, with $V_4$. However, by choosing $V_2$ much greater than $V_4$ (a 10/1 ratio is sufficient), the denominator remains constant enough so that the equation for $V_7$ is a very good approximation to the desired equation.

A.-C. Control Signal

An A.-C. control signal $V_8$ is now required, with a magnitude proportional to $V_7$ and a phase corresponding to the direction of rotation of the output shaft of the reversible drive. An A.-C. tachometer coupled to the reversible drive output will supply a signal whose phase reverses with reversal of direction of the output shaft. By amplifying this signal $V_T$ (FIG. 3a) and limiting its magnitude to a constant value $V_{TL}$ by rectifiers $D_3$ and $D_4$, a constant voltage $V_9$ is obtained.

Figure 4A:
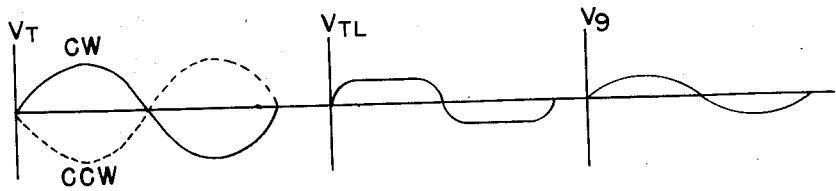
FIG. 4a is a diagram showing a progressively modified wave form produced by the tachometer amplifier and limiter circuit of this invention.

The wave forms of FIG. 4a show voltages $V_T$, $V_{TL}$ and $V_9$. Above a certain minimum speed, the magnitude of $V_T$ is clipped and remains constant at magnitude $V_{TL}$. $V_{TL}$ is then filtered to provide the wave form of $V_9$.

$V_9$ is now used as the carrier input to a standard ring modulator 20, as shown in FIG. 3a $V_7$ is the D.-C. input to the same modulator. The output voltage $V_8'$ is an A.-C. signal with the same phase as $V_9$. The magnitude of $V_8'$ is proportional to $V_7$. Practical circuitry and suitable components easily provide $V_8$ with the desired characteristics over a 50-to-1 speed range, and the amount of A.-C. signal $V_8$ fed to the control amplifier is varied by adjusting the gain control.

D.-C. Control Signal Circuit

Certain circuit details which may be used in the construction shown in FIG. 2 are shown in FIG. 6. The load sensing circuit is the same as in FIG. 3a or FIG. 3b. The D.-C. voltage $V_7$ is available as before, and is directly proportional to the real load on the motor.

To obtain the correct polarity of the D.-C. voltage for a particular direction of output rotation, the tachometer signal is again utilized. It is amplified, clipped and filtered as shown is FIGS. 3a and 4a.

Voltage $V_9$ is now connected to a demodulator 30, and is compared with a reference voltage $V_{10}$. A D.-C. voltage $V_{11}$ is then available. Its magnitude is proportional to $V_9$ and its polarity reverses as the phase of $V_9$ reverses. $V_{11}$ operates a polarity-sensitive relay to switch the D.-C. control signal as shown in FIG. 2. Thus, the correct polarity of $V_7$ is fed to the control amplifier (FIG. 5) through the feed-back circuit in accordance with the direction of rotation of the reversible speed drive. This signal has the characteristics originally desired.

A polarity-sensitive relay as shown is one means of obtaining the required switching. It could also be done by means of transistors or other similar devices.

Complete System Operation

The balanced control $P_1$ of the load sensing circuit can be used to set the real load level of the motor, above which the signal $V_8$ will provide a speed boost. This latter fact is particularly important in systems with large no-load losses. It permits the correction of speed-drop only for variable loads above any fixed losses.

One general layout is shown in FIG. 5, where all of the components shown, with the exception of the tachometer amplifier and limiter circuit and the load-sensing circuit connected through the modulator (or demodulator and relay) would be standard items for a speed control system. An operator would set the speed reference potentiometer and a voltage would thus be made available, to be amplified by the electronic control amplifier. This, in turn, would force the control motor to accelerate. The tachometer would provide a voltage proportional to the speed. When this tachometer voltage approximately equalled the speed reference voltage, the mechanical amplifier would thereafter maintain this output speed and through the additional control signal generating circuits of this invention, counteract the effect of speed-drop under load increase.

Having thus described my invention and the advantages thereof, I do not wish to be limited to the details herein disclosed, otherwise than as set forth in the claims, but what I claim is:

1. In a system for controlling the speed of a reversible drive powered by an A.-C. motor, first circuit means operatively connected to the energizing circuit of said motor for generating a first signal having a magnitude corresponding to the real load on said motor, second circuit means operatively connected to said reversible drive for generating a second signal having a polarity corresponding to the direction of rotation of said drive, and means combining said first and second signals to provide a control signal having a magnitude corresponding to the real load on said motor and a polarity corresponding to the direction of rotation of said drive.

2. The system of claim 1, wherein said second circuit means comprises speed responsive means operatively connected to said drive for generating a signal having a magnitude corresponding to the speed of rotation of said drive and a polarity corresponding to the direction of rotation of said drive, and voltage limiting means maintaining the magnitude of said last-named signal constant at all speeds above a predetermined maximum, whereby the magnitude of said control signal is independent of the speed of rotation of said drive at all speeds above said predetermined maximum.

3. The system of claim 2, wherein said first signal is D.-C., said second signal is A.-C., and said first and second signal combining means comprise means modulating said second signal with said first signal to produce an A.-C. control signal having a magnitude corresponding to the real load on said motor and a polarity corresponding to the direction of rotation of said drive.

4. The system of claim 2, wherein said first signal is D.-C., said second signal is A.-C., and said first and second signal combining means comprise switch means operative to reverse the polarity of said first signal, polarity sensitive switch control means, and demodulator means converting said second signal to a D.-C. switch control signal.

5. The system of claim 1, wherein said first circuit means includes means providing said first signal only when the real load on said motor exceeds a predetermined value.

6. The system of claim 1, together with means selectively adjustable to vary the magnitude of said control signal and thereby vary the extent of speed control.

References Cited in the file of this patent
UNITED STATES PATENTS

| | | |
|---|---|---|
| 2,548,454 | Winter | Jan. 4, 1949 |
| 2,668,268 | Hunter et al. | Feb. 2, 1954 |